United States Patent [19]

Hsu

[11] Patent Number: 5,573,804

[45] Date of Patent: Nov. 12, 1996

[54] PREPARATION OF INTERWINED PASTA PRODUCTS

[75] Inventor: Jau Y. Hsu, Brookfield, Conn.

[73] Assignee: Nestec S.A., Vevey, Switzerland

[21] Appl. No.: 313,766

[22] Filed: Sep. 28, 1994

[51] Int. Cl.$^6$ .............................. A23L 1/16; A23L 1/162; A23L 3/40; A21D 6/00
[52] U.S. Cl. .......................... 426/496; 426/549; 426/557
[58] Field of Search ................................. 426/496, 549, 426/557

[56] References Cited

U.S. PATENT DOCUMENTS

| | | | |
|---|---|---|---|
| 3,537,862 | 11/1970 | Peters et al. . | |
| 4,368,210 | 1/1983 | Murakami et al. | 426/557 |
| 4,370,352 | 1/1983 | Murakami et al. | 426/557 |
| 4,675,199 | 6/1987 | Hsu . | |
| 5,063,072 | 11/1991 | Gillmore, et al. . | |
| 5,151,289 | 9/1992 | Ozawa et al. | 426/557 |
| 5,256,435 | 10/1993 | Cuperus . | |
| 5,294,452 | 3/1994 | De Francisci | 426/496 |

Primary Examiner—Esther M. Kepplinger
Assistant Examiner—Choon P. Koh
Attorney, Agent, or Firm—Vogt & O'Donnell, LLP

[57] ABSTRACT

Dry uncooked folded, intertwined long pasta is steamed to obtain a surface-gelatinised pasta which then is contacted with water to obtain a wet pasta, and the wet pasta is steamed.

16 Claims, No Drawings

PREPARATION OF INTERWINED PASTA PRODUCTS

BACKGROUND OF THE INVENTION

The present invention relates to a process for the production of a quick-cooking pasta more particularly a folded, intertwined, long pasta.

U.S. Pat. No. 5,063,072 describes a process for preparing a fast-cooking pasta which comprises soaking uncooked pasta in water for a period of time sufficient to hydrate the pasta and then cooking the soaked pasta by heating for a period of time shorter than would be needed to cook pasta which had not been previously been soaked. It is also stated that, before soaking, the uncooked pasta may be dried at a temperature of from 165° F. to 190° F. (74° C. to 88° C.), depending on the dough composition, to obtain a dry pasta which can tolerate cold water soaking. Drying methods described in this patent include hot air, microwave and superheated steam.

U.S. Pat. No. 5,256,435 describes a process for preparing a dried pasta which can rapidly be reconstituted for consumption which comprises steaming a formed, wet pasta while intermittently spraying water having a pH of from 5 to 5.5 and a temperature of 90° C. onto the formed pasta, so that the temperature of the formed pasta steamed and sprayed does not fall below 97° C., to cook and hydrate the formed pasta to obtain a cooked pasta having a dry matter content of from 35% to 45% by weight and then drying the cooked pasta. The losses of starting material, essentially starch, are said to be from 6 to 8% by weight. The pasta is completely cooked by this process.

SUMMARY OF THE INVENTION

According to the present invention there is provided a process for the production of a quick-cooking pasta which comprises steaming a dry uncooked folded, intertwined long pasta to obtain a steamed surface-gelatinised pasta, contacting the steamed surface-gelatinised pasta with water to obtain a wet pasta and then steaming the wet pasta to obtain a folded, intertwined long partially cooked pasta.

DETAILED DESCRIPTION OF THE INVENTION

In this invention, long pastas means any pastas which are not "short goods". "Short goods" include rotini, shell, short noodle, etc., which are usually packaged in a bag instead of a long box and are less than 7 cm long. Long pastas comprise strands at least 7 cm long, e.g. at least 10 cm and preferably at least 15 cm long. The strands of regular long pasta are 25.5 cm long, but strands of long pastas can be as long 30 cm or even more, e.g. 40 cm.

In this invention, by folded, intertwined long pastas, I mean pastas consisting of a plurality of strands having a length of at least 7 cm up to 40 cm or more which are intertwined and folded to give a pasta having a length less than the length of the individual strands. Folded intertwined pastas include pasta nests, matassa or "cakes". Pasta nests have a roughly round shape somewhat similar to a bird's nest. Pasta cakes have a roughly square shape often with a wavy appearance. In matassa, the strands are roughly "layered" together in a more orderly manner, usually in a rectangular shape.

Folded, intertwined, long pastas are attractive for several reasons. For example, they can be packaged easily, they are suitable for portion and calorie control, and they can be cooked in a regular microwave cooking bowl. However, folded, intertwined long pastas suffer from a sticking problem after cooking, especially if cooked at a temperature less than boiling, whereby starch leaches out to cause stickiness and poor texture.

For microwave cooking, it is obviously desirable that the pastas are cooked using cold water at the start because if the water has to be heated first before adding the pastas, most of the convenience aspect of microwave cooking is lost.

I have found that when a dry uncooked folded, intertwined long pasta is steamed, contacted with water for a short period of time and then steamed again to partially cook it, the treated pasta can be cooked for consumption in water at a temperature less than boiling to give a cooked pasta which has a low cooking loss and which is not only free from stickiness, but also has a good texture. In contrast, if a dry short, flat noodle or long spaghetti in single unfolded form with the individual strands packed together in mass form is treated in a similar way, the steam and water cannot penetrate uniformly owing to the absence of spaces or voids between the strands and sticking of the strands occurs.

Before cooking for consumption, the treated pasta of the present invention may optionally be dried. I have found that if the treated pasta was not dried but instead kept at refrigerated temperature, there was sufficient moisture gain to convert the original dry pasta into a chilled wet pasta which could be cooked in a shorter period of time.

The dry uncooked folded, intertwined long pasta may weigh from 15 to 100 g usually from 20 to 80 g, for example from 25 to 65 g. The volume of the dry uncooked folded, intertwined long pasta may be from about 50 cm$^3$ to about 270 cm$^3$. Examples of dry uncooked folded intertwined pastas include pasta nests, pasta cakes and matassa.

The dry pasta is an uncooked pasta preferably dried by a conventional drying process, e.g. at a temperature from 50° to 75° C., relative humidity of 70 to 80% and a long drying time such as from 1 to 10 hours.

The moisture content of the dry uncooked folded, intertwined long pasta is preferably from 3 to 13% by weight based on the total weight of the pasta.

The thickness of the pasta strands may be from 0.2 To 2.0 mm and preferably from 0.5 to 1.5 mm.

The steaming of the dry uncooked folded, intertwined long pasta gelatinises at least part of the surface of the pasta, e.g. at least 50% and preferably substantially all the surface of the pasta. The steaming may be carried out for a period of from 1 second to 15 minutes, preferably from 10 seconds to 10 minutes and more preferably from 30 seconds to 5 minutes. The temperature of the steam may be from 85° to 100° C. and preferably from 90° to 95° C. Saturated steam or steam at atmospheric condition may conveniently be used, if desired.

Contacting the steamed pasta with water may conveniently be carried out by dipping into water or by spraying with the water. The duration of the contact with the water may suitably be from 0.1 second to 2 minutes, preferably from 0.2 seconds to 1 minute and especially from 0.5 to 30 seconds. The period of contact with the water may be longer than two minutes, e.g. up to 10 minutes if a wet, chilled pasta with a higher moisture content is desired.

The temperature of the water used for contacting the steamed pasta may be from just above freezing point, e.g.

from 0.5° C., up to 60° C., preferably from 15° C. to 40° C. and more preferably from 20° C. to 35° C. Ambient temperatures are the most convenient.

The steaming of the wet folded, intertwined long pasta gelatinises the starch sufficiently to give a partially cooked pasta. The gelatinisation is preferably at least 50% and more preferably from 75% to 100%. The steaming may be carried out for a period of from 1 to 30 minutes, preferably from 2.5 to 20 minutes and especially from 5 to 15 minutes. The temperature of the steam may be from 85° to 100° C. and preferably from 90° to 95° C. Saturated steam or steam at atmospheric condition may conveniently be used, if desired.

After steaming the wet pasta, the pasta may be cooled to refrigeration temperatures to give a wet chilled pasta or dried to reduce the moisture content, preferably to a moisture content approximately similar to that of the original dry uncooked pasta. Drying may be carried out by any conventional method, e.g. a heated drum, an infrared tunnel, a microwave oven, a dielectric heater or, more conveniently, by hot air. The drying time may be from 5 to 60 minutes and preferably from 10 to 30 minutes.

The wet chilled pasta may be cooked on a stove top or in a microwave oven within about 2 to 10 minutes. The dried pasta may be reconstituted for consumption by adding to an appropriate amount of cold tap water and heated in a microwave oven, e.g. at high power for from 2 to 10 minutes, preferably from 3 to 7 minutes.

EXAMPLES

The following Examples further illustrate the present invention. In all the Examples, the steam used for the preparation of the samples was steam at atmospheric condition.

Example 1

A test was carried out by preparing four samples derived from 30 g of a pasta nest consisting of vermicilli having strands of 1 mm thickness.

Sample A of the present invention was prepared by steaming the nest at 90° to 95° C. for 2 minutes, dipping into cold tap water for 1 second, steaming again at 90° to 95° C. for 8 minutes and then drying in hot air at 95° C. for 18 minutes to a moisture content of 9.5%.

Sample B (a Comparative Example) was prepared by first dipping the nest into cold tap water for 1 second, steaming for 10 minutes at 90° to 95° C. and then drying at 95° C. in hot air for 18 minutes to a moisture content of 9.4%.

Sample C (a Comparative Example) was prepared by first steaming the nest for 10 minutes at 90° to 95° C. and then drying at 95° C. in hot air for 7 minutes to a moisture content of 9.2%.

Sample D (a Comparative Example) was not subjected to any treatment and had a moisture content of 10.2%.

These samples were tested as follows:

1. Soaking test

Place 27 g pasta nest in 250 cc water (15° C.) and stand 90 minutes. The drained pasta wt., water wt., % solid in water, % leach-out and % pasta moisture are determined and shown in the following Table.

| Samples | Water wt. | Pasta wt. | % Water solids | % Leach-out | Pasta moisture |
| --- | --- | --- | --- | --- | --- |
| A | 208 g | 67 g | 0.24% | 1.8% | 62.3% |
| B | 212 g | 64 g | 0.33% | 2.6% | 59.2% |
| C | 217 g | 57 g | 0.45% | 3.6% | 55.6% |
| D | 222 g | 53 g | 1.26% | 10.4% | 54.2% |

These results show the degree of starch leach-out is in D, C, B, A order, the more the leach-out, the less pasta wt., the more water wt. and the less pasta moisture content (because of less starch to hold moisture). These results also show that steaming alone (sample C) was not as good as steaming/water dipping/steaming (sample A) or water dipping/steaming (sample B) to prevent starch leach-out because of lack of moisture for pasta surface gelatinisation to prevent leach-out of starch.

2. Cooking test

Place 30 g pasta nest in 300 cc water, stand 10 min. and then microwave at high power for 5 min. After draining off the water, the pasta stickiness was observed and the pasta firmness was determined (by a Texture Analyzer). The results are as follows:

| Samples | Pasta firmness | Pasta stickiness |
| --- | --- | --- |
| A | 5.8 kg | not sticking |
| B | 5.5 kg | sticking |
| C | 4.3 kg | least sticking |
| D | 3.3 kg | most sticking |

Steaming alone (sample C) is the best method to prevent sticking of pasta nest, but its firmness was not as good as sample A or B because of lack of moisture for pasta surface gelatinization and there was more starch leach out in this sample. By steaming first, then water dipping and steaming (sample A), it can prevent sticking better than a pasta nest dipped in water first, then steaming (sample B) because of steaming effect on the dry pasta nest.

Example 2

A test was conducted by preparing four samples similar to the samples in Example 1 but with thicker pasta consisting of thin spaghetti having a thickness of 1.25 mm and in different fold form (matassa). Comparison of the samples showed similar results like Example 1, but starch leach-out was less and the cooked pasta was firmer in texture because of thicker pasta. Sticking of the pastas was also less because of more "space" among pastas in matassa form.

Sample A of the present invention was prepared by steaming the matassa at 90° C. to 95° C. for 2 minutes, dipping into cold tap water for 1 second, steaming again at 90° to 95° C. for 8 minutes and then drying in hot air at 95° C. for 18 minutes to a moisture content of 10.1%.

Sample B (a Comparative Example) was prepared by first dipping the matassa into cold tap water for 10 minutes, steaming for 10 minutes at 90° to 95° C. and then drying at 95° C. in hot air for 18 minutes to a moisture content of 10.3%.

Sample C (a Comparative Example) was prepared by first steaming the matassa for 10 minutes at 90° to 95° C. and then drying at 95° C. in hot air for 10 minutes to a moisture content of 10.4%.

Sample D (a Comparative Example) was not subjected to any treatment and had a moisture content of 10.2%.

1. Soaking test

Place 27 g matassa pasta in 250 cc water (15° C.) and stand for 90 minutes. The drained pasta wt., water wt., % solids in water, % leach-out and pasta moisture are determined and shown in the following Table:

| Samples | Water wt. | Pasta wt. | % Water solids | % Leach-out | Pasta moisture |
|---------|-----------|-----------|----------------|-------------|----------------|
| A | 216 g | 60 g | 0.12% | 1.0% | 57.6% |
| B | 218 g | 59 g | 0.17% | 1.4% | 56.2% |
| C | 223 g | 52 g | 0.30% | 2.5% | 53.2% |
| D | 227 g | 50 g | 1.35% | 11.3% | 51.8% |

2. Cooking test

Place 30 g matassa pasta in 300 cc water, stand for 10 minutes, then microwave at high power for 5 min. After draining off the water, the pasta stickiness was observed and the pasta firmness was determined (by a Texture Analyzer). The results are as follows:

| Samples | Pasta firmness | Pasta stickiness |
|---------|----------------|------------------|
| A | 10.8 kg | not sticking |
| B | 8.9 kg | not sticking |
| C | 7.4 kg | least sticking |
| D | 4.8 kg | most sticking |

The difference between sample A & B is not as significant as that in Example 1, this being due to the fact that there is more "space" among pastas in matassa form than in a nest and therefore, the tendency for pastas to stick in matassa is less than that in a nest. Nevertheless, there is a significant difference in pasta firmness between A & B.

Example 3

A test was conducted by soaking samples A, B, C & D prepared in Example 1 in water for 1 second and 1 minute respectively and determining pasta moisture content. The samples soaked for 1 minute were also cooked in a microwave oven for 5 minutes and the pasta's stickiness & firmness were evaluated. The results are as follows:

| Samples | Soaking Time | Pasta moisture | Cooked pasta's stickiness | Cooked pasta's firmness |
|---------|--------------|----------------|---------------------------|-------------------------|
| A | 1 sec | 16.8% | | |
|   | 1 min | 25.1% | not sticking | 9.5 kg |
| B | 1 sec | 17.5% | | |
|   | 1 min | 27.8% | sticking | 8.0 kg |
| C | 1 sec | 16.9% | | |
|   | 1 min | 26.5% | least sticking | 6.8 kg |
| D | 1 sec | 15.2% | | |
|   | 1 min | 23.5% | most sticking | 5.8 kg |

These results show that the water dipping time affects moisture pick-up significantly and higher moisture, wet, "chilled" pastas can be prepared this way. These results also showed that the effect of processing methods on the stickiness and firmness of pastas delayed 1 min for microwave cooking is the same as pastas delayed 10 min for cooking (cooking condition used in Example 1 & 2) except all cooked pastas are firmer in texture because of less starch leach-out.

Example 4

A test was conducted by dipping initially steamed, uncooked pasta nests in water for different periods of time to prepare chilled, wet pastas with different moisture contents, then compared with the dry pasta sample (sample A in Examples 1 & 3 prepared by steaming/water dipping/steaming/drying process) for microwave cooking time and pasta firmness.

Sample A of the present invention was prepared by steaming the nest at 90° to 95° C. for 2 minutes, dipping into cold tap water for 1 second, steaming again at 90° to 95° C. for 8 minutes and then drying in hot air at 95° C. for 18 minutes to a moisture content of 9.5%.

Sample E (a Comparative Example) was prepared by first steaming for 10 minutes at 90° to 95° C., dipping the nest into cold tap water for 1 second, and then steaming at 90° to 95° C. for 8 minutes to a moisture content of 28.5%.

Sample F (a Comparative Example) was prepared by first steaming the nest for 2 minutes at 90° to 95° C., dipping into cold tap water for 10 seconds, and then steaming for 8 minutes at 90° to 95° C. to a moisture content of 33.2%.

Sample G (a Comparative Example) was prepared by first steaming the nest for 2 minutes at 90°–95° C., dipping into cold water for 30 seconds and then steaming for 8 minutes at 90° to 95° C. to give a moisture content of 35.0%.

Sample H (a Comparative Example) was prepared by first steaming the nest for 2 minutes at 90° to 95° C., dipping into cold water for 60 seconds and then steaming for 8 minutes at 90° to 95° C. to a moisture content of 38.0%.

Microwave cooking

Place 30 g of the pasta nest in 300 cc water, stand for 1 minute and microwave cook at high power for different periods of time. The cooked pasta firmness and moisture contents were determined and shown in the following Table.

| Samples | Water dipping time | Pasta moisture | Cooking time | Cooked Pasta's firmness | Cooked Pasta's moisture |
|---------|--------------------|----------------|--------------|-------------------------|-------------------------|
| A | 1 sec | 10.0% | 5 min | 9.5 kg | 63.5% |
| E | 1 sec | 28.5% | 4 min | 8.5 kg | 62.0% |
| F | 10 sec | 33.2% | 4 min | 8.1 kg | 65.5% |
| G | 30 sec | 35.0% | 4 min | 8.4 kg | 62.2% |
| H | 60 sec | 38.0% | 3 min | 9.6 kg | 62.5% |

These results show that wet, chilled pastas with different moisture contents can be prepared by different water dipping times and the microwave cooking time of these wet pastas could be 1 to 2 minutes shorter than the dry pasta with similar pasta firmness and cooked moisture.

I claim:

1. A process for the production of a pasta product comprising steaming a dry uncooked folded, intertwined long pasta to surface-gelatinise the pasta to obtain a surface-gelatinised pasta, contacting the surface-gelatinised pasta with water to obtain a wet pasta and steaming the wet pasta to obtain a pasta product.

2. A process according to claim 1 wherein, by weight, the dry pasta has a moisture content of from 3% to 13%.

3. A process according to claim 1 wherein the surface-gelatinised pasta is dipped into water for contacting the surface-gelatinised pasta with water.

4. A process according to claim 1 wherein the surface-gelatinised pasta is sprayed with water for contacting the surface-gelatinised pasta with water.

5. A process according to claim 1 further comprising drying the pasta product.

6. A process according to claim 5 wherein the pasta product is dried to a moisture content of approximately 3% to 13%.

7. A process according to claim 1 further comprising cooling and refrigerating the pasta product.

8. A process according to claim 1 wherein the surface-gelatinised pasta is contacted with water for a time of up to 10 minutes.

9. A process according to claim 7 wherein the surface-gelatinised pasta is contacted with water for a time of up to 10 minutes.

10. A process according to claim 1 wherein the dry pasta is steamed for from 10 seconds to 10 minutes, the surface-gelatinised pasta is contacted with water for from 0.5 seconds to 30 seconds and the wet pasta is steamed for from 5 minutes to 15 minutes.

11. A process according to claim 1 wherein the water has temperature of from 0.5° C. to 60° C.

12. A process according to claim 1 wherein the dry pasta is steamed with steam having a temperature of from 90° C. to 95° C., the surface-gelatinised pasta is contacted with water having a temperature of from 0.5° C. to 60° C., and the wet pasta is steamed with steam having a temperature of from 90° C. to 95° C.

13. A process according to claim 12 wherein the surface-gelatinised pasta is contacted with water having a temperature of from 20° C. to 35° C.

14. A process according to claim 1 wherein the dry pasta is a pasta nest.

15. A process according to claim 1 wherein the dry pasta is a matassa.

16. A process according to claim 1 wherein the dry pasta is a pasta cake.

* * * * *